Dec. 30, 1958 — E. E. REESE — 2,866,344
WINDSHIELD WIPER ACTUATING MECHANISM
Filed Dec. 8, 1955 — 2 Sheets-Sheet 1
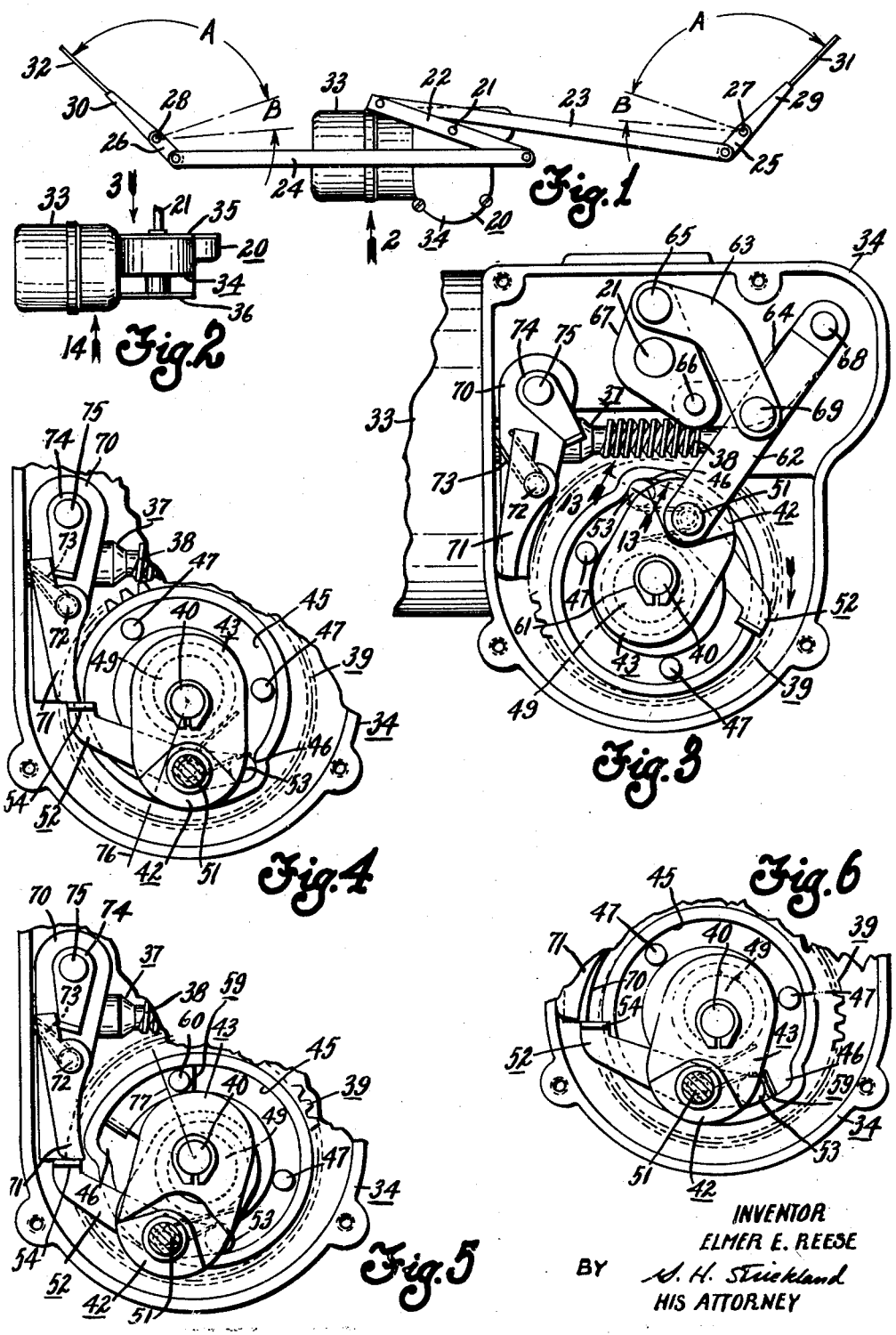
INVENTOR
ELMER E. REESE
BY N. H. Strickland
HIS ATTORNEY

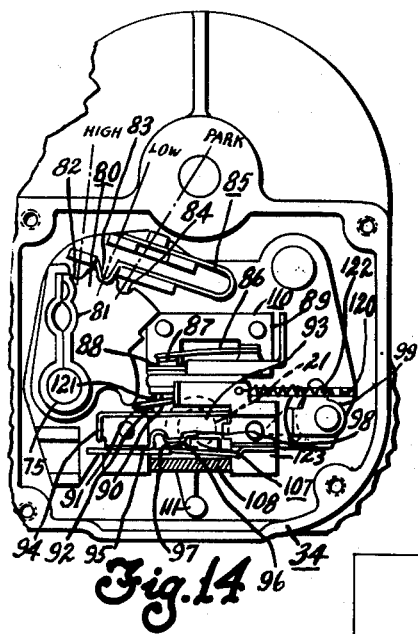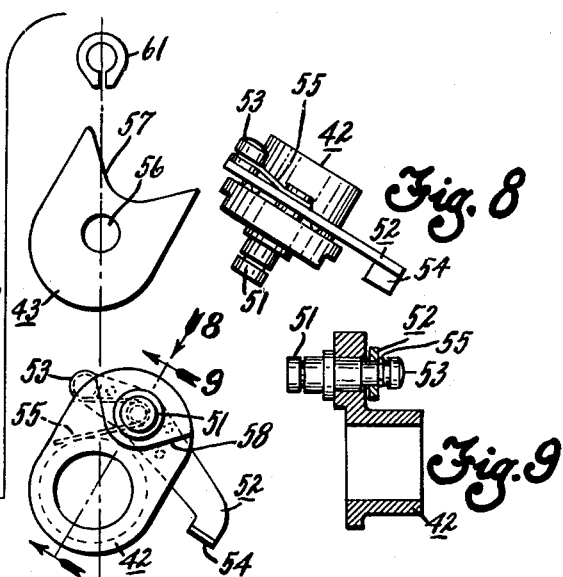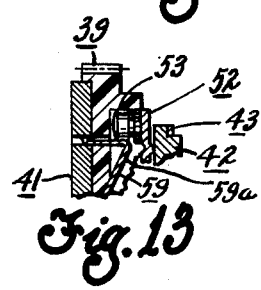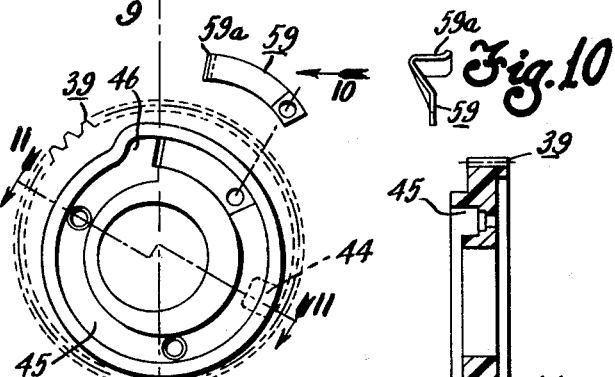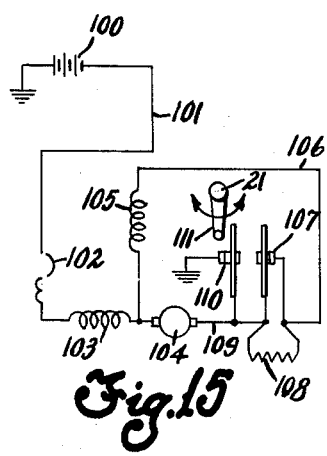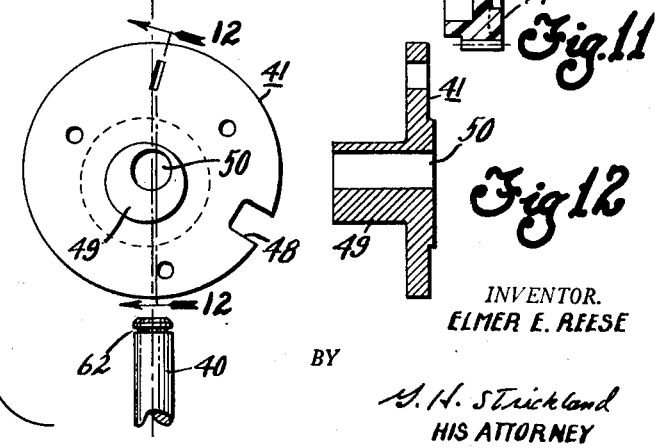

United States Patent Office 2,866,344
Patented Dec. 30, 1958

2,866,344

WINDSHIELD WIPER ACTUATING MECHANISM

Elmer E. Reese, Rochester, N. Y., assignor to General Motors Corporation, Detroit, Mich., a corporation of Delaware Application December 8, 1955, Serial No. 551,800

19 Claims. (Cl. 74—70)

This invention pertains to mechanical movements for actuating windshield wipers, and particularly to a crank assembly for converting rotation to oscillation including means for varying the throw of a crank so as to vary the amplitude of oscillation imparted to windshield wiper blades.

Heretofore, it has been proposed to dynamically brake an electric motor to stop motion converting mechanism at a predetermined angular position so as to park wiper blades against the cowl of a vehicle. An arrangement of the aforesaid type is disclosed in copending application Serial No. 435,012, filed June 7, 1954, in the name of Walter D. Harrison and assigned to the assignee of this invention. While mechanisms incorporating a dynamically braked electric motor are entirely satisfactory from an operational standpoint, the dynamic braking feature necessarily increases the cost of the unit. The present invention relates to novel motion converting mechanism wherein the crank throw is increased to park the wiper blades after arresting crank rotation to thereby drive the blades into the parked position, after which the electric motor is deenergized and coasts to a standstill without appreciably altering the parked position of the wiper blades. Accordingly, among my objects are the provision of a crank assembly for converting rotation to oscillation including means for varying the throw of the crank; the further provision of a mechanical movement including adjustable crank means and eccentric means for adjusting the throw of the crank means; and the still further provision of an electric motor driven windshield wiper actuating mechanism including a variable crank throw assembly wherein the motor is deenergized and coasts to a standstill after driving a driven member to the parked position.

The aforementioned and other objects are accomplished in the present invention by the incorporation of eccentric means for varying the radial position of a crank pin with respect to the axis of a driving member after positively arresting rotation of the crank pin. Specifically, the present invention constitutes an improvement over the mechanism disclosed and claimed in copending application Serial No. 481,767, filed January 14, 1955, now Patent No. 2,832,225, in the name of John G. Hart and assigned to the assignee of this invention. The instant crank assembly includes a fixed shaft; a worm gear rotatably journaled on the shaft, a worm gear having a notched internal cam track and an eccentric hub attached thereto; an eccentric cap member journaled on the eccentric hub, the cap member carrying a crank pin and a spring-biased pawl, or interlocking means, engageable with the notch in the worm gear cam surface; and a washer carried by the eccentric cap.

In the subject crank assembly, rotation of the eccentric cap which carries the crank pin is arrested at a predetermined angular position by a latch arm which engages the spring-biased pawl when the wiper blades are substantially at a normal stroke end position. Thereafter, the radius of the crank pin is increased to move the wiper blades beyond the normal stroke end position to a parked position. In the crank assembly of the aforementioned copending application Serial No. 481,767, rotation of the crank pin can only be arrested by arresting rotation of the electric motor, and, hence, dynamic braking means are employed. However, in the instant crank assembly, coasting of the motor to a standstill after deenergization thereof does not appreciably alter the position of the crank pin, or the wiper blades, since the maximum coast angle of the motor will only vary the crank position .015 inch. Accordingly, the crank assembly of this invention appreciably simplifies the windshield wiper actuating mechanism and materially reduces the production cost thereof.

Further objects and advantages of the present invention will be apparent from the following description, reference being had to the accompanying drawings wherein a preferred embodiment of the present invention is clearly shown.

In the drawings:

Fig. 1 is a schematic view, in elevation, of windshield wiper actuating mechanism, linkage and wiper blades, the actuating mechanism being constructed according to this invention.

Fig. 2 is a side view, in elevation, of the windshield wiper actuating mechanism taken in the direction of arrow 2 of Fig. 1.

Fig. 3 is a fragmentary view, with the crank assembly cover removed, taken in the direction of arrow 3 of Fig. 2, with the mechanism in operating position.

Fig. 4 is a fragmentary view of the actuating mechanism going into park.

Fig. 5 is a fragmentary view of the actuating mechanism in the parked position.

Fig. 6 is a fragmentary view of the actuating mechanism coming out of park.

Fig. 7 is an exploded view of certain parts of the crank assembly, illustrating their relative positions when the actuating mechanism is in the operating position.

Fig. 8 is a view, in elevation, of the eccentric cap assembly taken in the direction of arrow 8 of Fig. 7.

Fig. 9 is a sectional view taken along line 9—9 of Fig. 7.

Fig. 10 is a view, in elevation, of the lock spring taken in the direction of arrow 10 of Fig. 7.

Figs. 11 and 12 are sectional views taken along lines 11—11 and 12—12, respectively, of Fig. 7.

Fig. 13 is a fragmentary sectional view taken along line 13—13 of Fig. 3.

Fig. 14 is a fragmentary view with the switch cover removed taken in the direction of arrow 14 of Fig. 2.

Fig. 15 is an electrical circuit diagram of the windshield wiper actuating mechanism.

With particular reference to Fig. 1 of the drawings, a typical vehicle windshield wiper installation is shown comprising electric motor driven actuating mechanism 20 for converting rotation to oscillation. The mechanism 20 includes an oscillatable output shaft 21, which is attached to a link 22, opposite ends of the link 22 being connected by links 23 and 24 to rocker arms 25 and 26, respectively. The rocker arms 25 and 26 are drivingly connected with rocker shafts 27 and 28 to which wiper arms 29 and 30, carrying blades 31 and 32, are drivingly connected. In accordance with conventional vehicle wiper installations, the blades 31 and 32 have imparted thereto simultaneous asymmetrical movement throughout the angle A during wiping operation, and may be moved through the additional angle B to a parked position adjacent the cowl of a vehicle, not shown, when operation of the mechanism is discontinued.

The actuating mechanism 20, as seen in Fig. 2, includes a unidirectional electric motor 33, the housing of which is attached to a housing 34 for the motion converting mechanism. The housing 34 includes a crank assembly cover plate 35 and a switch assembly cover plate 36, the oscillatable output shaft 21 extending through the cover 35 and being rotatably journaled within the housing 34 by suitable bearing means, not shown.

As shown in Fig. 3, the unidirectional electric motor 33 includes an armature shaft 37 having an integral worm 38 formed thereon. The worm 38 meshes with a worm gear 39, which is rotatably journaled on a fixed shaft 40 supported by the housing 34. The armature shaft 37 is driven unidirectionally so as to impart clockwise rotation to the worm gear 39, as shown in Figs. 3 through 6.

With particular reference to Figs. 7 through 12, the crank assembly of the actuating mechanism of this invention will be described in detail. The crank assembly includes the worm gear 39, an eccentric hub 41, an eccentric cap member 42, and a washer 43. The worm gear 39 is formed with an integral driving lug 44 and an internal cam track 45 having a notch 46. The eccentric hub 41 is connected to the worm gear 39 by a plurality of rivets 47, as shown in Fig. 3, and, in addition, has a notch 48 for receiving the driving lug 44. The eccentric hub assembly also includes an eccentric portion 49 having a circular opening 50 therethrough through which the fixed shaft 40 extends. Thus, the worm gear 39 and the eccentric hub 41 rotate in unison.

The eccentric cap, or driven element, 42 is rotatably journaled on the eccentric portion 49 of the hub 41. In addition, the cap 42 has fixedly attached thereto a crank pin 51. The crank pin 51, in addition to being connected to linkage means, to be described, pivotally supports a drive pawl 52, or interlocking means. One end of the driving pawl 52 has a pin 53 attached thereto, and the other end of the driving pawl 52 has a latching surface 54 formed thereon. The pawl 52 is spring-urged in a clockwise direction, as seen in Fig. 7, by a hairpin spring 55, opposite ends of which bear against the pin 53 and the cap 42, the bight of the hairpin spring 55 being supported by the crank pin 51. The washer 43 is formed with a circular aperture 56 through which the fixed shaft 40 extends, the washer 43 having a concave surface 57 engageable with a complementary surface 58 of the cap member 42 so as to prevent relative movement therebetween.

In addition, the crank assembly includes a lock spring 59 of generally arcuate configuration, the lock spring being retained by a rivet 60, shown in Fig. 5, in a portion of the cam track 45. The lock spring 59 includes an upturned end 59a, which cooperates with the notch 46 and retains the pin 53 of the driving pawl 52 within the notch 46 during normal running operation of the actuating mechanism, as seen in Fig. 13. The several components of the crank assembly are maintained in assembled relation on the fixed shaft 40 by a snap ring 61, which is received in an annular groove 62 of the shaft 40.

Referring again to Figs. 3 through 6, the crank pin 51 is also pivotally connected to one end of a connecting rod 62. The connecting rod 62 constitutes a component of the linkage for imparting oscillation to the output shaft, or driven member, 21 upon rotation of the worm gear 39. This linkage includes a pair of crossed links 63 and 64, the inner ends of which are pivotally connected at 65 and 66, respectively, to opposite ends of a rocker arm 67, which is attached to the shaft 21. The inner end of link 63 is connected by a pivot 69 to the intermediate point of connecting rod 62, while the outer end of link 64 is connected by pivot 68 to the outer end of connecting rod 62. This linkage is of the type disclosed in the aforementioned copending application Serial No. 435,012, and constitutes no part of this invention. Suffice it to say that upon rotation of the crank pin 51 by the worm gear 39, oscillation will be imparted to the shaft 21, which oscillation will be transmitted by the linkage hereinbefore described to the wiper blades.

The actuating mechanism also includes a latch arm assembly comprising a stationary latch arm 70 fixedly supported within the housing 34, and a movable latch arm 71 pivotally supported by a pin 72 carried by the arm 70, the arm 71 being spring-biased in the clockwise direction by a hairpin spring 73. In order to impart counterclockwise movement to the movable latch arm 71, a link 74 attached to a manually oscillatable shaft 75 is employed. The shaft 75 is supported for oscillation within the housing 34 and is manually movable between the positions depicted in Figs. 3 and 4 in a manner to be described hereinafter.

Operation of the crank assembly in converting rotation to oscillation and including means for varying the throw of the crank to vary the amplitude of oscillation imparted to shaft 21 will now be described. As alluded to hereinbefore, the motor shaft 37 imparts clockwise rotation to the worm gear, or driving member, 39 of the crank assembly. The crank assembly is shown in its operating condition in Fig. 3 and in this position continuous clockwise rotation of the worm gear 39 will impart oscillation of fixed amplitude to the driven member 21, which will, in turn, cause the wiper blades to move throughout the angle A. In order to vary, or, more particularly, increase, the amplitude of oscillation imparted to the shaft 21, so as to move the wiper blades to the parked position throughout the angle A+B, the latch operating link 74 is moved in a clockwise direction from the position of Fig. 3 to the position of Fig. 4. It is pointed out that this manipulation may be effected at any time and irrespective of the angular position of the crank pin 51. When the link 74 is moved in a clockwise direction, it engages the movable latch arm 71 so as to effect pivotal movement thereof in a counterclockwise direction from the position depicted in Fig. 3 to the position depicted in Fig. 4. Accordingly, upon continued rotation of the worm gear 39 and the eccentric cap 42 through the driving connection established by the drive pawl 52, when the latching surface 54 of the drive pawl 52 is moved to the angular position of Fig. 4, the cycle of increasing the throw of the crank pin 51 will be initiated. At this point, the movable latch arm 71 will engage the latching surface 54 of the driving pawl 52, thereby effecting counterclockwise pivotal movement of the pawl 52 so as to remove the pin 53 from the notch 46 in the cam track 45. At this point, the eccentric cap assembly 42 continues to move angularly from the position of Fig. 4 to the position of Fig. 5, during which time the latching surface 54 of the driving pawl 52 is moved outwardly to engage the stationary latch arm 70. Thereafter, angular, or rotational, movement of the eccentric cap assembly 42 and the crank pin 51 is positively arrested. However, continued rotation of the worm gear 39 and the eccentric hub 41 from the angular position depicted by line 76 in Fig. 4 to the position depicted by line 77 (an angular gear rotation of 140°) in Fig. 5 will effect angular displacement of the eccentric hub 41 relative to the eccentric cap 42 and thereby move the crank pin 51 radially outward to increase its throw. Accordingly, the wiper blades will be moved throughout the angle A+B to the parked position.

To resume normal wiping operation, the link 74 is moved in a counterclockwise direction from the position of Fig. 5 to the position of Fig. 3. In so doing, the movable latch arm 71 is moved by the spring 73 from the position of Fig. 5 to the position of Fig. 3. Upon rotation of the worm gear 39 and the eccentric hub 41, the crank pin 51 will move radially inward during angular movement of the worm gear 39 and the eccentric hub 41 from the position of Fig. 5 to the position of Fig. 6. During this angular movement, the driving pawl 52 moves inwardly by reason of having its pin 53 confined in the cam track 45, and upon further angular movement of the worm gear 39, the pin 53 moves over the locking spring 59 and back into the notch 46 so as to drivingly interconnect the eccentric cap assembly 42 and the crank pin 51 for rotation with the worm gear 39.

With particular reference to Figures 14 and 15, the electric circuit and switch mechanism for controlling the electric motor will be described. The switch mechanism includes a manually oscillatable control member 80, which is attached to the shaft 75. The shaft 75 also has attached thereto an operator 81, which may be attached to the end of a Bowden wire control cable, not shown. The control member 80 has three peripheral notches 82, 83 and 84, which cooperate with a detent spring 85 to form stops for the park, low and high positions of the switch mechanism. As seen in Fig. 15, the motor energizing circuit includes a battery 100, one terminal of which is grounded, and the other terminal of which is connected to a wire 101. The wire 101 is connected through a thermostatic overload circuit breaker 102 to one end of a series field winding 103. The other end of the series field winding 103 is connected to one terminal of an armature 104 and one end of a shunt field winding 105. The other end of the shunt field winding 105 is connected by a wire 106 to a high speed switch 107, which, when closed, short-circuits a shunt field resistor 108, and when open, connects the resistor 108 in series with the shunt field winding 105. The other terminal of the armature 104 is connected to a wire 109, which connects with high speed switch 107, as well as the low speed and park switch 110. The switch 110 may be opened automatically by an oscillatable arm 111, which is drivingly connected to the oscillatable shaft 21, the arm 111 only being capable of opening the switch 110 when the wiper blades reach their parked position.

Referring again to Fig. 14, the thermal overload circuit breaker, depicted by numeral 102, includes a bimetallic arm 86, which carries a contact 87, the contact 87 normally engaging a fixed contact 88. The overload switch 110 is supported on a bracket 89 within the housing 34. The control switch, which, per se, constitutes no part of this invention, comprises a leaf spring member 90 carrying a contact 91 constituting a contact of the park and low speed switch 110. The contact 91 is arranged to engage a contact 92 carried by a leaf spring member 93. The leaf spring member 93 is formed with a downwardly directed portion 94 arranged to engage leaf spring 95 which carries a contact 96 of the high speed switch 107. The contact 96 is arranged to engage a contact 97 carried by a leaf spring 98, it being understood that when the contacts 96 and 97 are in engagement, the resistor 108 is shunted. When the control member 80 is moved in a clockwise direction so that the spring detent 85 engages the notch 82, a projection of the control member engages the leaf spring 90 and pushes the leaf spring 93 downwardly so as to separate contacts 96 and 97. In the low speed position, as indicated, the contacts 91 and 92 are in engagement, as well as the contacts 96 and 97. When the control member 80 is moved so that the detent spring 85 engages the notch 84, the contacts 91 and 92 will remain closed until the oscillatable arm 111 attached to the shaft 21 is moved to the park position where the end of the arm 111 engages a link 99 pivotally supported in a switch base. The link 99, when pivoted clockwise by the arm 111, moves a slider 120 to the right to free leaf spring 90 for upward movement, thereby separating contacts 91 and 92. Normally, a prong 121 on the leaf spring 90 engages the left-hand end of the slider 120 and thereby prevents upward movement of the leaf spring 90. The slider 120 is normally maintained in the position depicted in Fig. 14 by a spring 122, one end of which is attached to a switch bracket 123 and the other end of which is attached to the slider 120.

*Operation*

Operation of the electric motor driven windshield wiper will be briefly summarized. With the mechanism running, to park the wiper blades, the operator need only manipulate a control knob, not shown, which actuates a Bowden wire, not shown, to move the operating member 81 and the shaft 75 in a counterclockwise direction, as viewed in Fig. 4. Counterclockwise movement of the shaft 75 will place the control member 80 in the park position and also pivot the link 74 from the position of Fig. 3 to the position of Fig. 4. Thereafter, continued rotation of the worm gear by the electric motor, which remains energized through contacts 91 and 92 to the position of Fig. 4, will result in arresting rotation of the eccentric cap and crank pin after which the crank pin is moved radially outward to increase the stroke of the wiper blades and move them to a parked position. When the throw of the crank is a maximum, the arm 111 will engage the link 99 so as to move the slider 120 and permit separation of contacts 91 and 92, thereby deenergizing the motor. Thus, after the wiper blades have been driven to the parked position, the motor is deenergized and coasts to a standstill. During motor coasting to a standstill, the radial position of the crank pin is not appreciably effected since the maximum eccentric portion of the eccentric hub 41 is located, as depicted in Fig. 5, and motor coasting throughout an angle of 80° will not displace the crank pin radially more than .015 inch. In normal operation, it has been found that the worm gear comes to rest within 40° rotation after motor deenergization.

To resume wiper operation, the operator effects clockwise movement of the shaft 75, thereby closing contacts 91 and 92 through control member 80 and allowing the movable latch 71 to return to the position of Fig. 3. Accordingly, the motor is energized and imparts clockwise rotation to the worm gear 39 and the driving pawl 52 is repositioned in the notch 46 so as to cause the crank pin 51 to rotate with the worm gear. During this movement, the throw of the crank pin is reduced to normal. To increase the speed of wiper operation, the control member 80 is moved by the shaft 75 so that spring detent 85 engages notch 82 whereby contacts 96 and 97 are separated to connect the resistor 108 in series with the shunt field winding 105.

From the foregoing, it is apparent that the present invention provides an improved crank assembly wherein rotation of the crank is arrested prior to radial movement thereof to increase its throw. Moreover, by virtue of this improved crank assembly, the actuating mechanism can be more economically produced since the necessity of dynamically braking the motor is completely eliminated.

While the embodiment of the present invention as herein disclosed, constitutes a preferred form, it is to be understood that other forms might be adopted.

What is claimed is as follows:

1. Windshield wiper actuating mechanism including, a rotatable driving member, a wiper actuating driven member, variable throw crank means operatively connected to said driven member, means interconnecting said crank means and said driving member to establish an interruptible driving connection therebetween, and means whereby arresting rotation of said crank means by interrupting the driving connection between said crank means and said driving member varies the throw of said crank means during continued rotation of said driving member.

2. Windshield wiper actuating mechanism including, a rotatable driving member, a wiper actuating driven member, variable throw crank means operatively connected to said driven member, spring-biased means interconnecting said crank means and said driving member to establish an interruptible driving connection therebetween, and means whereby arresting rotation of said crank means by interrupting the driving connection between said crank means and said driving member varies the throw of said crank means during continued rotation of said driving member.

3. Windshield wiper actuating mechanism including, a rotatable driving member, a wiper actuating driven member, variable throw crank means operatively connected to said driven member, a spring-biased pawl carried by said crank means and operable to engage said driving member to establish an interruptible driving connection therebetween, and means whereby arresting rotation of said crank means by interrupting the driving connection between said crank means and said driving member varies the throw of said crank means during continued rotation of said driving member.

4. Windshield wiper actuating mechanism including, a rotatable driving member, a wiper actuating driven member, variable throw crank means operatively connected to said driven member, a spring-biased pawl carried by said crank means and operable to engage said driving member to establish an interruptable driving connection therebetween, resilient means carried by said driving member and engageable with said pawl to normally maintain the driving connection between said crank means and said driving member, and means whereby arresting rotation of said crank means by interrupting the driving connection between said crank means and said driving member varies the throw of said crank means during continued rotation of said driving member.

5. Windshield wiper actuating mechanism including, a rotatable driving member, a wiper actuating driven member, said driving member including an eccentric hub, a driven element rotatably journaled on said eccentric hub, a variable throw crank carried by said driven element and operatively connected to said driven member, means interconnecting said driven element and said driving member to establish an interruptible driving connection therebetween, and means engageable with said driven element for arresting rotation thereof by interrupting the driving connection between said driven element and said driving member so that continued rotation of said driving member varies the throw of said crank.

6. Windshield wiper actuating mechanism including, a rotatable driving member, a wiper actuating driven member, said driving member including an eccentric hub, a driven element rotatably journaled on said eccentric hub, a variable throw crank carried by said driven element and operatively connected to said driven member, a spring-biased pawl carried by said driven element and operable to engage said driving member to establish an interruptible driving connection therebetween, and means engageable with said driven element to interrupt the driving connection between said driven element and said driving member and arresting rotation of said driven element whereby continued rotation of said driving member varies the throw of said crank.

7. Windshield wiper actuating mechanism including, a rotatable driving member, a wiper actuating driven member, said driving member including an eccentric hub, a driven element rotatably journaled on said eccentric hub, a variable throw crank carried by said driven element and operatively connected to said driven member, said driving member also having a cam track therein with a notch, a spring-biased pawl carried by said driven element and operable to engage the notch in said cam track so as to establish an interruptible driving connection between said driving member and said driven element, and means engageable with said pawl to interrupt the driving connection between said driving member and driven element and arrest rotation of said driven element whereby continued rotation of said driving member varies the throw of said crank.

8. Windshield wiper actuating mechanism including, a rotatable driving member, a wiper actuating driven member, said driving member including an eccentric hub, a driven element rotatably journaled on said eccentric hub, a variable throw crank carried by said driven element and operatively connected to said driven member, said driving member also having a cam track therein with a notch, a spring-biased pawl carried by said driven element and operable to engage the notch in said cam track so as to establish an interruptible driving connection between said driving member and said driven element, resilient means disposed in said cam track adjacent said notch for normally maintaining the driving connection between said driving member and said driven element, and means engageable with said pawl for interrupting said driving connection and arresting rotation of said driven element whereby continued rotation of said driving member varies the throw of said crank.

9. A variable throw crank assembly including in combination, a rotatable driving member having an eccentric hub, an element rotatably journaled on said eccentric hub, means carried by said element and operable to engage said member to establish an interruptible driving connection therebetween, a crank carried by said element, and means for arresting rotation of said element by interrupting the driving connection between said member and said element to vary the throw of said crank during continued rotation of said driving member.

10. A variable throw crank assembly including in combination, a fixed shaft, a driving member rotatably journaled on said shaft and having an eccentric hub, an element rotatably journaled on said eccentric hub, a spring-biased pawl carried by said element and operable to engage said driving member so as to establish an interruptible driving connection therebetween, a crank carried by said element, and means engageable with said pawl for interrupting said driving connection and arresting rotation of said element to vary the throw of said crank during continued rotation of said driving member.

11. A variable throw crank assembly including in combination, a fixed shaft, a driving member rotatably journaled on said shaft and having an eccentric hub, an element rotatably journaled on said eccentric hub, a spring-biased pawl carried by said element and operable to engage said driving member so as to establish an interruptible driving connection therebetween, a crank carried by said element, resilient means carried by said driving member for normally maintaining the driving connection between said member and said element, and means engageable with said pawl for interrupting said driving connection and arresting rotation of said element to vary the throw of said crank during continued rotation of said driving member.

12. A variable throw crank assembly including in combination, a fixed shaft, a driving member rotatably journaled on said shaft, said driving member having an eccentric hub and a cam track therein with a notch, an element rotatably journaled on said eccentric hub, spring-biased means carried by said element and engageable with the notch in said cam track for establishing an interruptible driving connection between said element and said member, a crank carried by said element, and means for interrupting the driving connection between said element and said member and arresting rotation of said element whereby continued rotation of said member varies the throw of said crank.

13. A variable throw crank assembly including in combination, a fixed shaft, a driving member rotatably journaled on said shaft, said driving member having an eccentric hub and a cam track therein with a notch, an element rotatably journaled on said eccentric hub, a crank carried by said element, a spring-biased drive pawl carried by said element and engageable with the notch in said cam track for establishing an interruptible driving connection between said member and said element, resilient means disposed in said cam track for normally maintaining said driving connection, and means engageable with said pawl for interrupting the driving connection and arresting rotation of said element whereby continued rotation of said driving member varies the throw of said crank.

14. Windshield wiper actuating mechanism including, a rotatable driving member, a wiper actuating driven member, a unidirectional electric motor for rotating said driving member, a source of electric power, circuit means interconnecting said power source and said motor including a switch operable automatically when said driven member is moved to a predetermined position, variable throw crank means operatively connected to said driven member, means interconnecting said crank means and said driving member and establishing an interruptible driving connection therebetween, and means whereby arresting rotation of said crank means varies the throw thereof during continued rotation of said driving member and moves said driven member to said predetermined position to automatically operate said switch and deenergize said motor.

15. Windshield wiper actuating mechanism including, a rotatable driving member, a wiper actuating driven member, a unidirectional electric motor for rotating said driving member, a source of electric power, circuit means interconnecting said power source and said motor including a switch operable by said driven member when it is moved to a predetermined position, variable throw crank means operatively connected to said driven member, a spring-biased pawl carried by said crank means and operable to engage said driving member to establish an interruptible driving connection therebetween, and means whereby interrupting said driving connection and arresting rotation of said crank means varies the throw of said crank means an moves said driven member to said predetermined position to open said switch and deenergize said motor.

16. Windshield wiper actuating mechanism including, a rotatable driving member, a wiper actuating driven member, a unidirectional electric motor for rotating said driving member, a source of electric power, circuit means interconnecting said power source and said motor including a switch operable by said driven member when it is moved to a predetermined position, said driving member having an eccentric hub, a driven element rotatably journaled on said eccentric hub, crank means carried by said driven element and operatively connected to said driven member, means interconnecting said driven element and said driving member to establish an interruptible driving connection therebetween, and means for interrupting said driving connection and arresting rotation of said driven element to vary the throw of said crank means and move said driven element to said predetermined position to open said switch and deenergize said motor.

17. Windshield wiper actuating mechanism including, a rotatable driving member, a wiper actuating driven member, a unidirectional electric motor for rotating said driving member, a source of electric power, circuit means interconnecting said power source and said motor including a switch operable by said driven member when it is moved to a predetermined position, said driving member having an eccentric hub and a cam track therein with a notch, a driven element rotatably journaled on said eccentric hub, a variable throw crank carried by said element and operatively connected to said driven member, a spring-biased pawl carried by said driven element and operable to engage the notch in said cam track to establish an interruptible driving connection between said driving member and said driven element, and means engageable with said pawl for interrupting said driving connection and arresting rotation of said driven element whereby continued rotation of said driving member by said electric motor varies the throw of said crank to move said driven member to said predetermined position to open said switch and deenergize said motor.

18. Windshield wiper actuating mechanism of the character set forth in claim 17 including resilient means carried by said driving member and disposed in said cam track adjacent the notch for normally maintaining the driving connection between said driving member and said driven element.

19. Windshield wiper actuating mechanism of the character set forth in claim 17 wherein said last recited means comprises latch arm means which are movable into engagement with said pawl at a predetermined angular position thereof so as to interrupt the driving connection between said member and said element and thereafter arrest rotation of said driven element.

References Cited in the file of this patent

UNITED STATES PATENTS 2,832,225    Hart                   Apr. 29, 1958

FOREIGN PATENTS 873,802    Germany             Apr. 16, 1953